United States Patent [19]

Endo

[11] Patent Number: 4,528,442

[45] Date of Patent: Jul. 9, 1985

[54] PERSONAL IDENTIFICATION SYSTEM

[75] Inventor: Kimikazu Endo, Kyoto, Japan

[73] Assignee: Omron Tateisi Electronics, Co., Kyoto, Japan

[21] Appl. No.: 614,387

[22] Filed: May 25, 1984

Related U.S. Application Data

[63] Continuation of Ser. No. 451,234, Dec. 20, 1982.

[30] Foreign Application Priority Data

Feb. 2, 1982 [JP] Japan ................................ 57-16050
Dec. 23, 1982 [JP] Japan ................................ 56-215535
Dec. 23, 1982 [JP] Japan ................................ 56-215536

[51] Int. Cl.[3] ............................................ G06F 15/30
[52] U.S. Cl. .................................... 235/379; 235/380; 235/381; 235/382
[58] Field of Search ................ 235/379, 381, 380, 382

[56] References Cited

U.S. PATENT DOCUMENTS 3,221,304 11/1965 Enikeieff et al. .................... 340/149
4,134,537 1/1979 Glaser ................................ 235/379

*Primary Examiner*—Harold I. Pitts
*Attorney, Agent, or Firm*—Wegner & Bretschneider

[57] ABSTRACT

A personal identification system capable of using the information of a combination of certain questions and answers to said questions as the information to connect a card to its original owner, capable of displaying said questions at the time of card input and letting a card user enter answers to said questions displayed, and capable of making the use of said card effective upon coincidence between said answers entered and answers selected and registered in advance by an original owner of said card and of invalidating the use of said card upon uncoincidence between said answers.

12 Claims, 16 Drawing Figures

PERSONAL IDENTIFICATION SYSTEM

This is a continuation of Ser. No. 451,234, Dec. 20, 1982.

BACKGROUND OF THE INVENTION

The present invention relates to a personal identification system which can be utilized for a bank transaction processing system or an entrance and exit gate control system.

Only one magnetic card such as cash card (this will be called "card" hereinafter) is issued to a single user. However, the ordinary bank transaction processing system does not matter who is using a particular card and, thus, there is a danger of a fraudulent use of a card if the card is lost or copied.

Therefore, conventionally, a cryptographic number known only by the original owner of a card was predetermined, and the personal collation was made at the time of use of the card on the basis of an input of the cryptographic number by the user.

However, according to this kind of the identification system, there is such a problem that the owner of a card must be memorize a particular number (cryptographic number). In addition, there is another problem that the number of digits of a cryptographic number increases as the number of cards issued becomes larger, so that it becomes more difficult to memorize a cryptographic number. These problem are created because the combination of digits in a numeral is relatively complicated as information and it is not easy to memorize a numeral because of its inherent character.

BRIEF SUMMARY OF THE INVENTION

The basic object of the present invention is to provide a personal identification system capable of sufficiently preserving the secrecy by using a combination of both the certain questions and answers as information connecting a card to its original user without adding digits to the conventional cryptographic numbers or without using the conventional cryptographic numbers, and also capable of easily determining by the collation whether an user of the card is the original owner or not.

Another object of the present invention is to provide a personal identification system capable of offering a more accurate checking function by allowing the card owner to select certain questions and answers from a question file prepared in advance for the registration.

Another object of the present invention is to provide a personal identification system capable of preventing the fraudulent use of the card by a person other than the original owner by arbitrarily changing the order of the registered questions so as to prevent a particular question corresponding to an answer, the number of which was already known by the other person, from being known.

Another object of the present invention is to provide a personal identification system having a highly accurate checking function by selecting at random certain questions out of all questions registered, by displaying them, by comparing the answer data made for the questions, and by determining "collation OK" only when a predetermined number of answers have coincided in succession.

A further object of the present invention is to provide a personal identification system capable of preserving the high secrecy by establishing particular questions selected out of plural questions and by determining "collation OK" only when the answers to the particular questions have coincided with the answers to the ordinary questions.

Other and further objects of the present invention will become obvious upon an understanding of the illustrative embodiments about to be described or will be indicated in the appended claims, and various advantage not referred to herein will occur to one skilled in the art upon employment of the invention in practice.

DETAILED DESCRIPTION OF THE INVENTION

Figure 1:
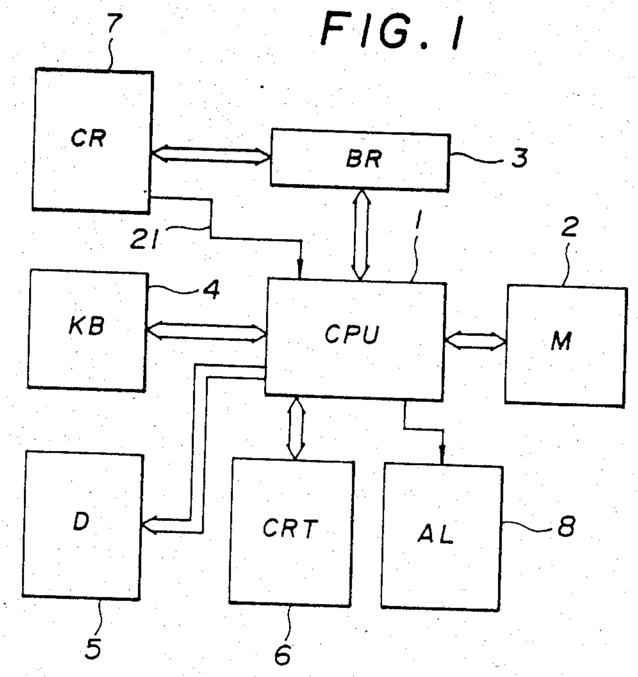
FIG. 1 is a block diagram of a bank transaction processing system indicating the first embodiment of the personal identification system of the present invention.

The present invention can be summarized as follows:

A combination of both particular questions and their answers is used as information connecting a card to an original owner of the card, said questions are displayed at the time of input of said card and an user of said card is asked to make answers to said displayed questions, and the use of said card is made effective only when said answers entered have coincided with answers selected by the original owner and registered in advance and is invalidated when both of them do not coincide with each other.

The number and kinds of questions to be used for the checking described above may be determined as desired. Also, any desired number of multiple choices of answers may be used for a particular question. However, the desired kinds of questions are those which will ask the characteristics peculiar to the original owner of a card. For example, the following questions and multiple choices of answer are desired:

(A) Which of the following ranges do you have for your height?
(1) Less than 150 cm
(2) Greater than 150 cm but smaller than 155 cm
(3) Greater than 156 cm but smaller than 160 cm
(4) Greater than 160 cm but smaller than 165 cm (5) Greater than 165 cm but smaller than 170 cm
(6) Greater than 170 cm but smaller than 175 cm
(7) Greater than 170 cm (B) Which of the following hobbies do you have?
(1) Reading books
(2) Sports
(3) Going to movie shows
(4) Do-it-yourself
(5) Making collections of things
(6) Flower arrangement
(7) Tea ceremony
(8) Calligraphy
(9) Others (C) Which of the following numbers of members do you have in your family?
(1) 1 person
(2) 2 persons
(3) 3 persons
(4) 4 persons
(5) 5 persons
(6) 6 persons
(7) 7 persons
(8) 8 to 10 persons
(9) More than 10 persons If a combination of questions and corresponding answers listed above is used as the information for connecting a card to its original owner, the original owner of the card is easily able to memorize the answers even if the number of questions increases.

Now, the first embodiment of the system of the present invention will be explained by making reference to the drawings.

FIG. 1 is a block diagram of a bank transaction processing system employing a system embodying the present invention.

This system is a stand-alone system and operates in offline mode. A computer 1 (this will be called "CPU" hereinafter) as an example of controller is connected with buses to a memory 2, a buffer register 3, a keyboard 4, a cash dispenser 5 and a display unit 6 (this will be called "CRT 6" hereinafter). Also, a card reader 7 and a buffer register 3 are connected together with buses, and data is exchanged between the card reader 7 and CPU 1 through the buffer register 3. In addition, CPU 1 receives the detection signal of a card input through a wire 21 from the card reader 7 and sends an alarm signal to an alarm device 8.

Figure 2:
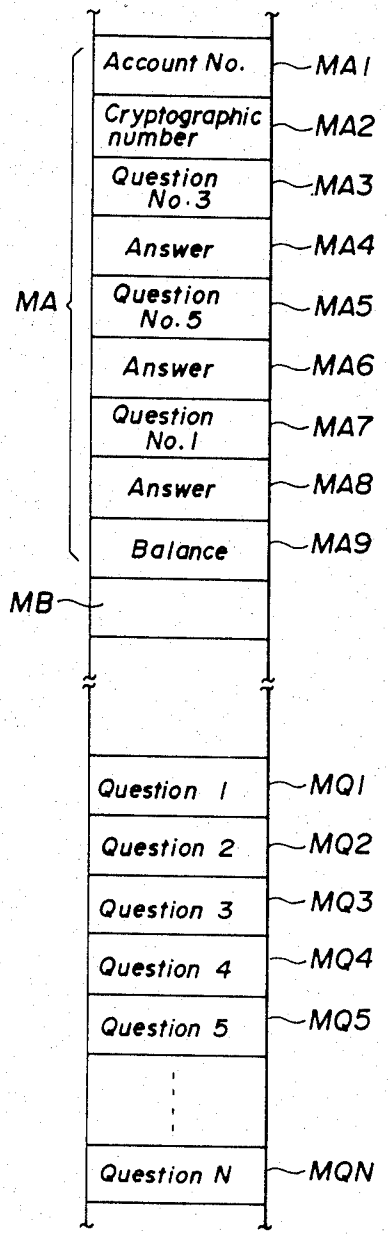
FIG. 2 is a memory map of said system.
Figure 3:
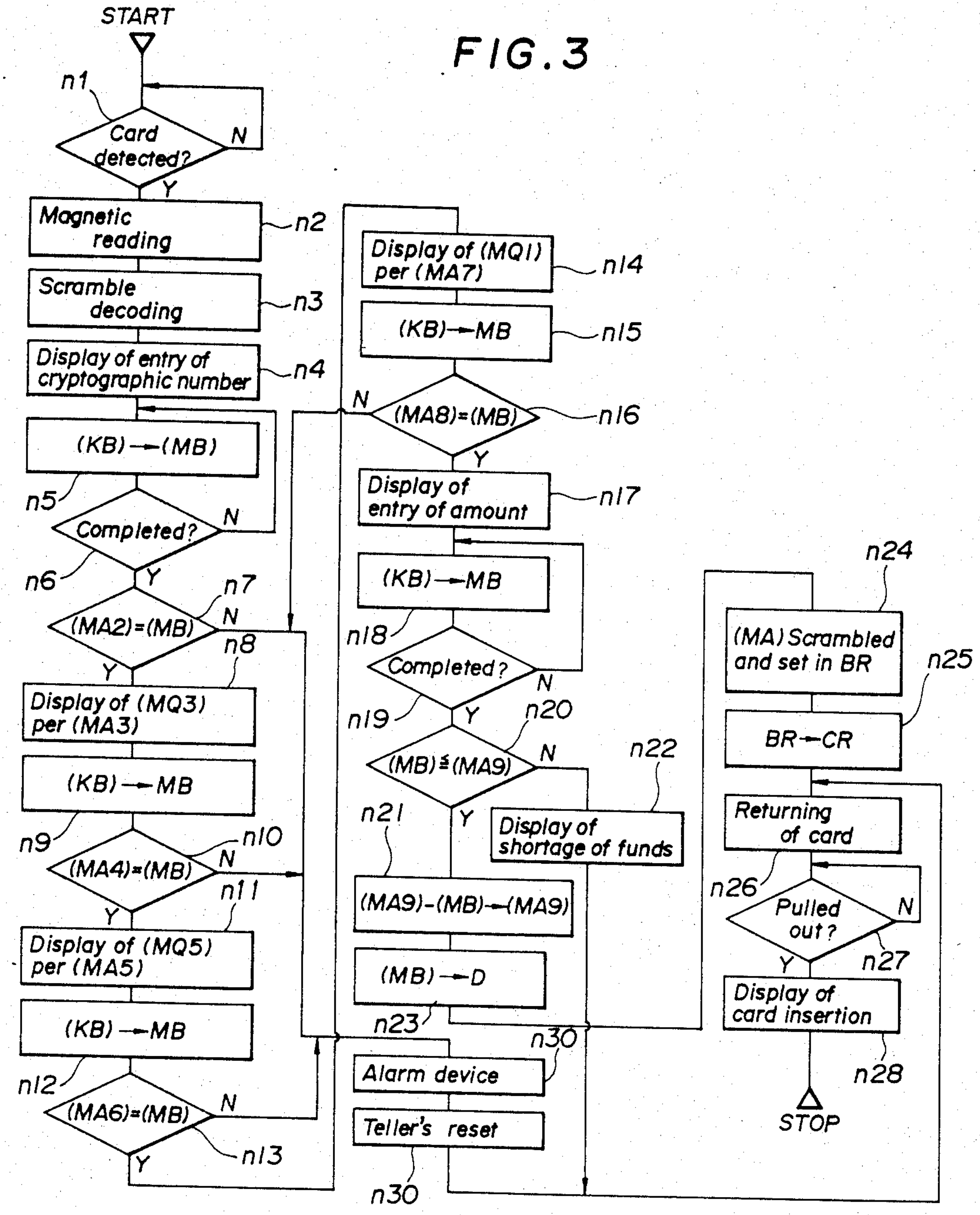
FIG. 3 is a control flowchart of computer.

FIG. 2 shows a partial map of the memory 2. Also, FIG. 3 is a flowchart showing the operation of CPU 1. Now, the control procedure of this system will be described below by making reference to FIGS. 2 and 3.

If a card input is detected in the step n1 (step n1 will be merely called "n1" hereinafter), the card is in n2. On this card, an account number, a cryptographic number, questions and answers (3 kinds) and a balance of deposit are magnetically recorded. The read card information is then scramble-decoded in n3, and the information decoded is written in the region MA of memory 2. The region MA comprises region MA1 for storing the account number, region MA2 for storing the cryptographic number, region MA3 for storing the number of the first question, region MA4 for storing the answer to the first question, region MA5 for storing the number of the second question, region MA6 for storing the answer to the second question, region MA7 for storing the number of the third question, region MA8 for storing the answer to the third question, and region MA9 for storing the balance of deposit. If the execution of n3 is necessary, this means that the right card information has been scrambled and stored on the card. In n4, an indication instructing "entry of cryptographic number" is displayed on CRT 6. However, in this embodiment, the cryptographic number is also utilized for checking the use of card. But it is not always required to use the cryptographic number. If this number is going to be used, it is desired to reduce the number of digits for easier memorizing. In this steps n5 and n6, a numeral with predetermined number of digits entered from the keyboard 4 is written in the region MB. In n7, the coincidence of the stored data in the region MB with the stored data in the region MA2 (cryptographic number registered in the card) is checked. If they coincide with each other, the cryptographic number deemed to be entered correctly and the operation advances to n8.

In n8 through n16, the answers to the questions are checked. Firstly in n8, the contents of region MA3 is used as an index, and the question content data (consisting of the questions and multiple choices of answer) corresponding to the index are read out of the question file and displayed. In this example, since the content of the region MA3 is the question No. 3, the content corresponding to region MQ3 is displayed. In this case, the question file has been prepared in advance and stored in the memory 2. In subsequent n9, the data of answers entered from the keyboard 4 is written in the region MB. In n10, the answer stored in region MB is compared to the answer in region MA4 (registered answer). If these two answers coincide with each other, the subsequent check is performed. The display of the subsequent question and the checking of its answer are performed in n11 through n13. The method of this checking is the same as that of n8 through n10. That is, in n11, the subsequent question and the choices of answer are displayed, an answer entered for the question and stored in the region MA is compared to the answer in the region MA6, and their coincidence is checked. In the same manner, an answer to the third question is checked in n14 through n16. Though three questions are used in this example, the questions are not limited to three. At the time of questioning to the card and registration of the answers, a predetermined number of questions (three in this example) will be selected out of all questions in the question file.

If the answers coincide with each other in n16, the paying processing for the requested amount is started. However, if any one of answers to the questions will not coincide, the operation advances from n10, n13 or n16 to n30 and the alarm device 8 is activated. Also, even if the cryptographic number does not coincide in n7, the operation advances to n30 and the alarm device 8 is activated. In this way, if an answer to a question is found to be different from the registered answer, the use of the card can be invalidated. After the operation of the alarm device 8, a teller will meet the fraudulent card user, and the rest button of the machine is depressed (n31). When the operation signal of the reset button is detected, the operation advances to the n26.

Now, the procedure after n17 will be described below. In n17, "entry of amount" is instructed. In n18 and n19, the amount entered from the keyboard 4 is set in the region MB. In n20, whether the amount of entry is lower than the balance (stored in MA9) is checked and if, the amount is smaller than the balance the balance in the region MA 9 is written (n21). If the amount exceeds the balance, then "shortage of funds" is displayed (n22). When the amount is smaller than the balance, the payment of the entered amount stored in the region MB is instructed to the cash dispenser in n23.

Upon completion of the payment, writing to the card and the card return processing are performed. In n24, the data of MA is scrambled and set in buffer 3. At this stage, the balance is the only data which has been changed after the card input. In n25, the scrambled data is transferred to the card reader 7. Then, upon completion of rewriting of the card, this card will be returned (n26). When the card is pulled out (n27), a display requesting "card insertion" is made (N28) and the next card input is waited.

Through the procedure described above, the checking of a card can be performed at the time of its use.

In the embodiment stated above, both the questions and answers are registered in the card itself. However, it is not always necessary to register the information concerning the card checking at its use on the card itself. If the system has a large-capacity memory, the information can be registered in the memory in the form of card information record file.

Figure 4:
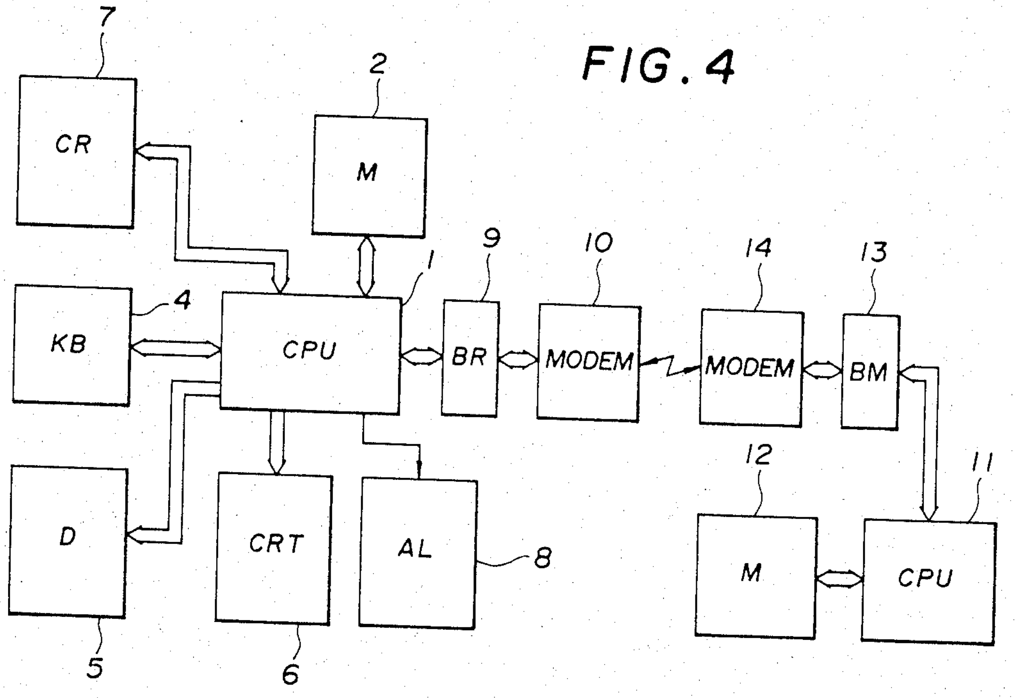
FIG. 4 is a block diagram of the bank transaction processing system of the second embodiment of the system of the present invention.

FIG. 4 shows a block diagram of bank transaction processing system as the second embodiment of the system of the present invention. And the features of this system are that the personal data (card information including the information for checking card at its use) is stored in the memory of master equipment, and the data exchange between the master equipment and the subsidiary equipment having the functions of terminal unit is performed using the communication line.

This subsidiary equipament is equipped with a CPU 1, a memory 2, a keyboard 4, a cash dispenser 5, a CRT 6, a card reader 7, an alarm device 8, a buffer register 9 for communication, and a modem 10. Also, the master equipment is provided with CPU 11, a large-capacity memory 12, a buffer memory 13 and a modem 14. Plural subsidiary equipment can be connected to a master equipment, and a subsidiary equipment is connected to a master equipment in online mode.

Figure 5:
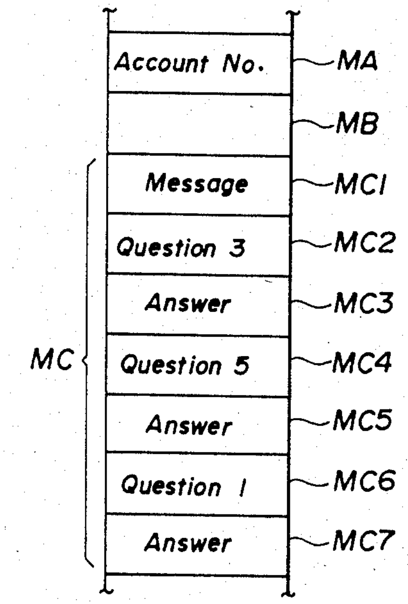
FIG. 5 and FIG. 6 are memory maps of subsidiary equipment and master equipment of said system.
Figure 6:
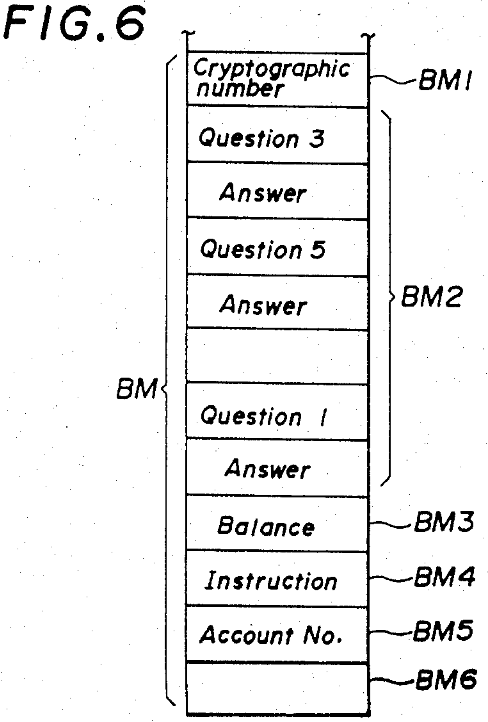
Figure 7:
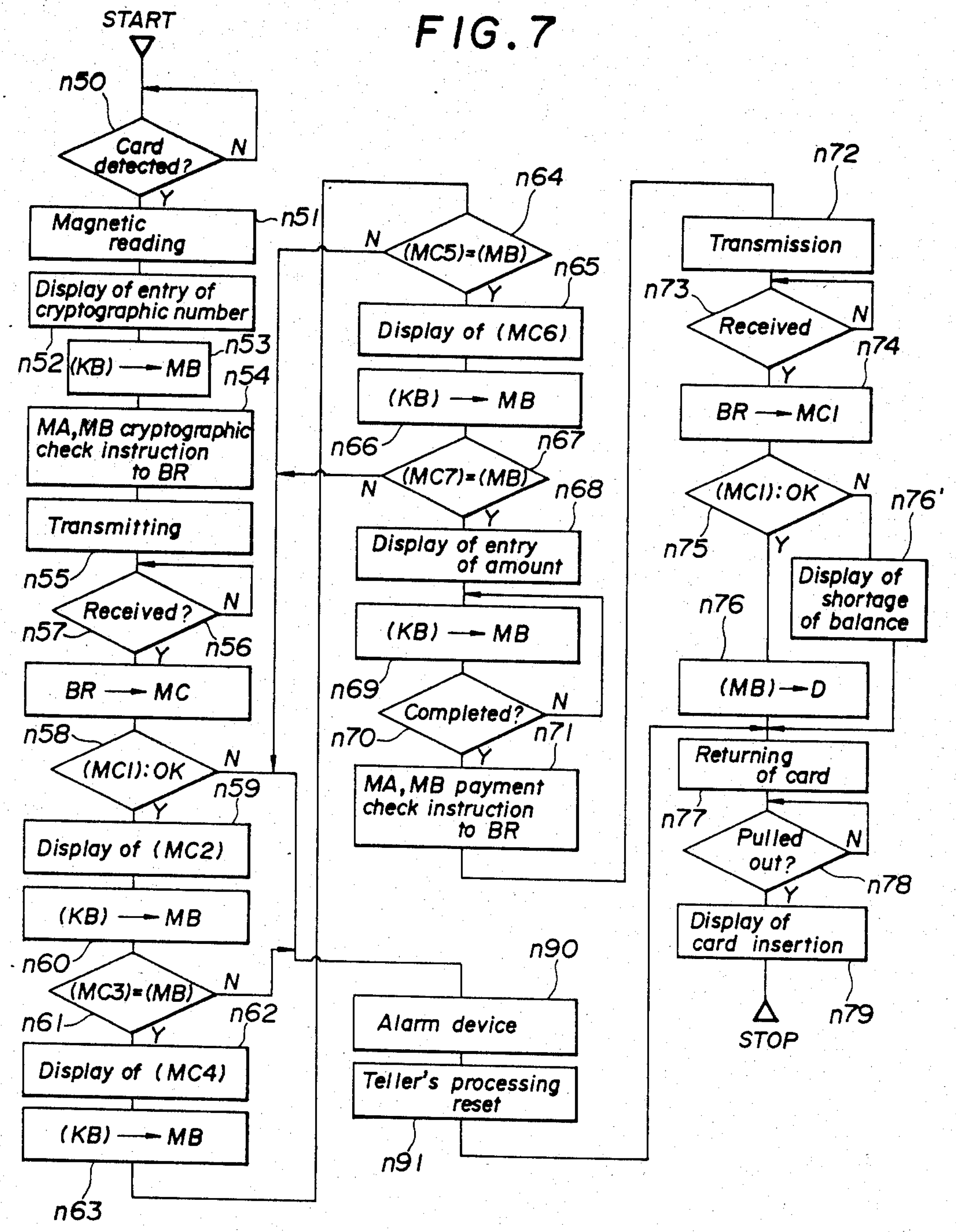
FIG. 7 and FIG. 8 are the control flowchart of a computer for the subsidiary and master equipment of said system.
Figure 8:
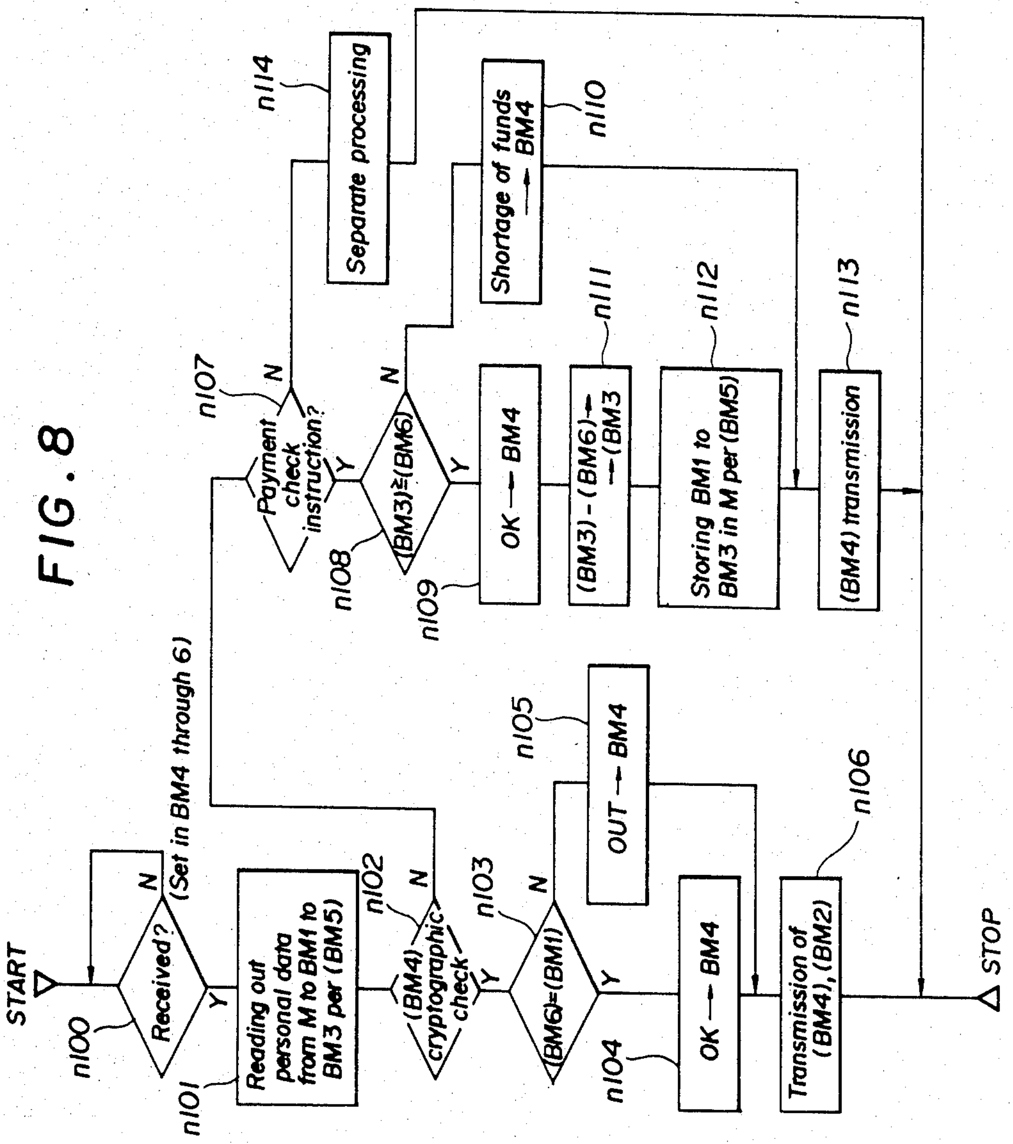

FIG. 5 shows a partial map of memory 2 of the subsidiary equipment, and FIG. 6 shows a buffer memory map of the master equipment. Also, FIG. 7 is a flowchart indicating the operation of the CPU 1 of the subsidiary equipment, and FIG. 8 is a flowchart showing the operation of the CPU 11 of the master equipment. The control procedure of this system will be explained below by making reference to FIG. 5 to FIG. 8.

In n50 and n51, the processing as same as those of n1 and n2 of FIG. 3 is performed. Also, n52 is the same as n4, and n53 is the same as n5. However, in this example, since a card not scramble-processed is handled, there is no step corresponding to n3. Instead, the data read from the card is stored in the region MA in n2. In n53, the checking of the number of digits is also performed. As same as the previous embodiment, the checking of the cryptographic number is not always necessary. No n52 and n53 are necessary when the cryptographic number is not checked.

Upon completion of the entry of the cryptographic number, the preparation for the transmission to the master equipment is performed in n54. This preparation is completed when the data of region MA (account No.), data of region MB (cryptographic number) and the cryptographic number check instruction are set in the buffer register 9. Upon completion of the preparation, the transmission is performed in n55 and the response-waiting state is made (n55, n56). Naturally, a request-to-send is sent to the master equipment at the time of transmission, and the data is transmitted after receiving the authorization signal form the master equipment. However, this procedure is not illustrated in the figure since it is well known. The code given to the subsidiary equipment is also transmitted so as to clarify a particular subsidiary equipment from which the data was sent to the master equipment, but the illustration of this procedure is is omitted in the figure since it is well known.

When the transmit data from the subsidiary equipment is received (n100 of FIG. 8), the master equipment sets the data in the buffer memory 12. At this stage, the cryptographic check instruction is set in the region BM4, the acount No. in the region BM5, and the cryptographic number in the region BM6 respectively, and the regions BM1 to BM3 remain blank.

In n101, the personal data is read from the memory 12 in conformity with the data (account No.) in the region BM5, and is set in the region BM1 to 3. Since the set data in the region BM4 is the cryptographic check instruction data, the operation advances from n102 to n103, the received data in region BM6 (cryptographic number) is compared to the memory read-out data in the region BM1 (registered cryptographic number), and OK data is set if they have coincided, and OUT data is set if they have not coincided respectively in the region BM4 (n104, n105). Then, in n106, the data in the regions BM4 and BM2 are transmitted to the subsidiary equiptment. At this time, either OK data or OUT data is set in the region BM4, and the question content data (consisting of both the questions and choices of answer) is set in the region BM2.

When the subsidiary equipment receives the transmit data from the master equipment, the operation advances to n57, and the stored data (received data) in the buffer register 9 is set in the region MC.

Then, whether the region MC1 has set OK data or not is checked, and, if the OK data is set, checking of answers to the questions is started in the steps after n59.

Each processing of n59 to n61, n62 to n64, and n65 to n67 is the same as each processing of n8 to n10, n11 to n13, and n14 to n16. That is, question 3 and the choices of the corresponding answer are dispalyed, whether the entered answer coincides with the answer in the region MC3 (registered answer) is checked, and then the same procedure is performed for each questions 5 and 1. If the uncoincidence of answers is judged in each step of n61, n64 and n67 in the above procedure, then the alarm device 8 is activated in n90. Also, when the content of the region MC1 is the OUT data in n58 (cryptographic check is OUT), the alarm device 8 is activated in n90. After this, the operation advances to n77 through the step n91 in which the same processing as that of n31 is performed.

The checking of card at its use is completed in n67 in a manner as described above.

Upon completion of the checking of card at its use, the operation advances to the paying process for the requested amount. The steps n68 to n70 process the entry of amount with the procedure as same as that of n17 to n19. In n71, preparations for the transmission are made for the master equipment. The preparations are completed when the contents of region MA (account No.), contents of region MB (entered amount of payment requested), and payment check instruction are set in the buffer register 9. After completing the preparations, the transmission is performed in n72 and the response-waiting state is made (n73).

After receiving the transmit data from the subsidiary equipment (n100), the master equipment sets the transmit data in the buffer memory 12. In this stage, the payment check instruction is set in the region BM4, the account No. in the region MB5, and the amount of payment requested in the region BM6 respectively, but the regions BM1 to BM3 remain blank.

In n101, the personal data is read again from the memory 12 in conformity with the data in the region BM5 (account No.) and is set in the regions BM1 to BM3. Since the set data in the region BM4 is the payment check instruction data at this stage, the operation advances to n102 and n107. And when the data is confirmed to be the payment check instruction data in n107, the operation advances to n108. In n108, whether the contents (balance) of the region BM3 is larger than the contents of region BM6 (data of amount of payment requested sent from the subsidiary equipment) is checked. If larger, OK data is set and, if not larger, the data of shortage of funds is set respectively in the region BM4 of the buffer memory 13 (n109, n110). In n111, the balance is rewritten, that is, the amount obtained after deducting the amount of payment requested from the original balance is set in the region BM3. Also, in n112, by making reference to the stored data (account No.) in the region BM5, the stored data in the regions BM1 to BM3 is stored in the predetermined region in the memory 12 (card information record file). By the execution of the step n112, the personal data is updated. Upon completion of the above procedure, the stored data in the region BM4 (OK data or data of shortage of funds) is transmitted to the subsidiary equipment.

Since the subsidiary equipment is in the receive-waiting state in n73 until the processing in the master equipment stated above is completed, the operation advances to n74 when the transmission from the master equipment is performed in n113. In this step, the received data is set in the region MC1. This data is checked in n75, and the operation advances to n76 if it is OK data and to n77 if it is the data of shortage of funds. In n76, the data of amount of payment requested, which is the stored data in the region MB in this stage, is transferred to the cash dispenser and the execution of the payment is commanded. In the checking in n75, if the received data is judged to be the data of shortage of funds, no payment is executed and the shortage of funds is displayed (n76). After the procedure stated above, the card is returned in n77, the card pulled out is confirmed (n78), a display instructing "card insertion" is made (n79), and then a subsequent card entry is waited. As described above, even in the system having the personal data recorded in the information record file of the master equipment, the checking of card at its use can be performed in the online mode.

Therefore, this embodiment of the system of the present invention is able to easily check whether the use of card is by its original owner or not and, thus, is able to provide a very practical card use system which does not give any burden to the card owner.

Figure 9:
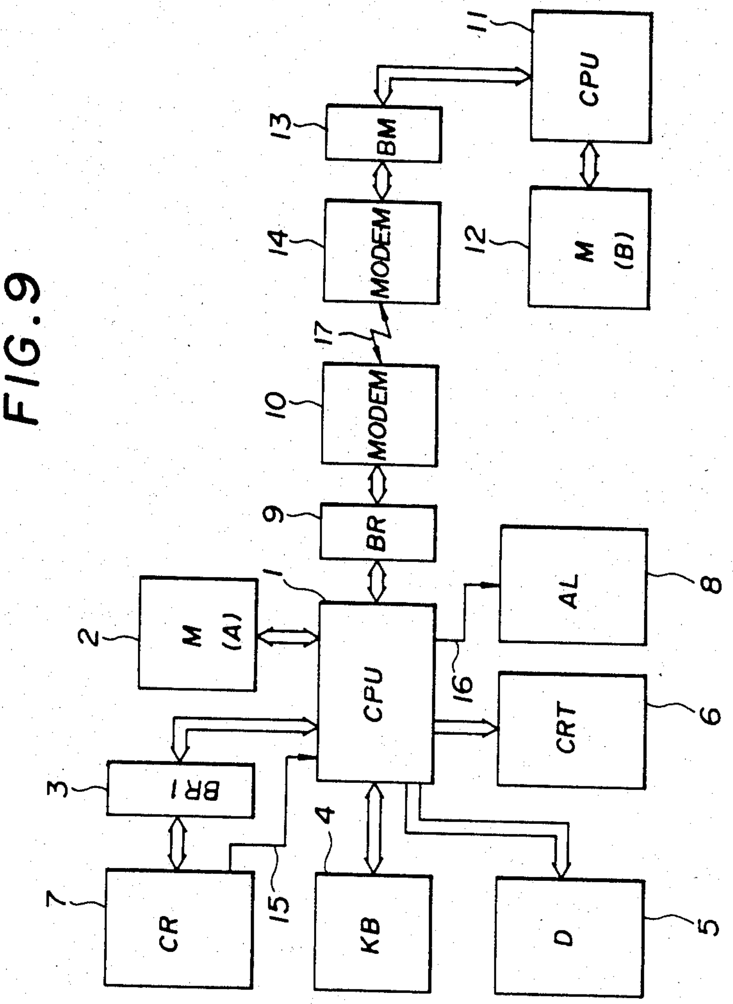
FIG. 9 is a block diagram of the bank transaction processing system indicating the third embodiment of said system embodying the present invention.

FIG. 9 is a block diagram of bank transaction processing system indicating the third embodiment of a system embodying the present invention.

This system is an online system in which the master equipment is connected to the subsidiary equipment with the communication line.

A computer 1 (this will be called CPU 1 hereinafter) as an example of controller of the subsidiary equipment is connected to a memory 2, a first buffer register 3, a keyboard 4, a cash dispenser 5, a display unit 6 (this will be called CRT 6 hereinafter), and a second buffer register 9 with buses. Also, a card reader 7 is connected to the buffer register 3 with buses, and the data exchanged between the card reader 7 and the CPU 1 through the buffer register 8. In addition, CPU 1 receives the detection signal of a card input from the card reader 7 through a wire 15, and also sends an alarm signal to an alarm device 8 through a wire 16.

The master equipment has a computer 11 (this will be called "CPU 11" hereinafter) as an example of controller for the master equipment, a memory 12 for storing the balance data and so forth, and a buffer memory 13. This master equipment and said subsidiary equipment are connected by a communication line 17 through modems 10 and 14, and the subsidiary equipment is able to operate in the online mode.

Figure 10:
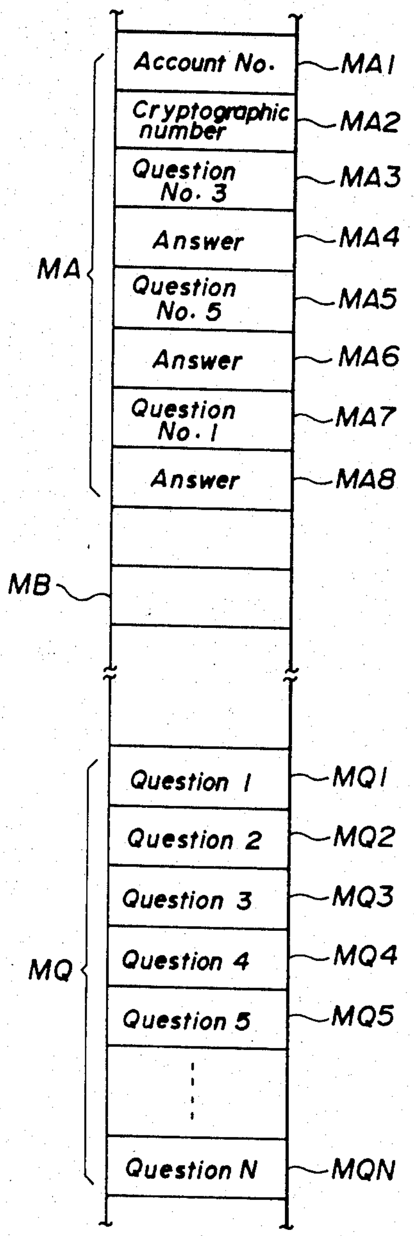
FIG. 10 is a memory map of the subsidiary equipment of said system.
Figure 11:
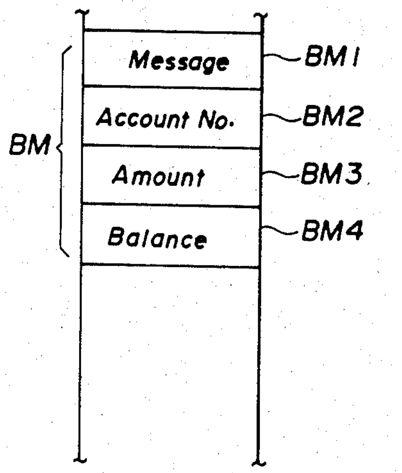
FIG. 11 is a partial map of a buffer memory of master equipment in said system.
Figure 12:
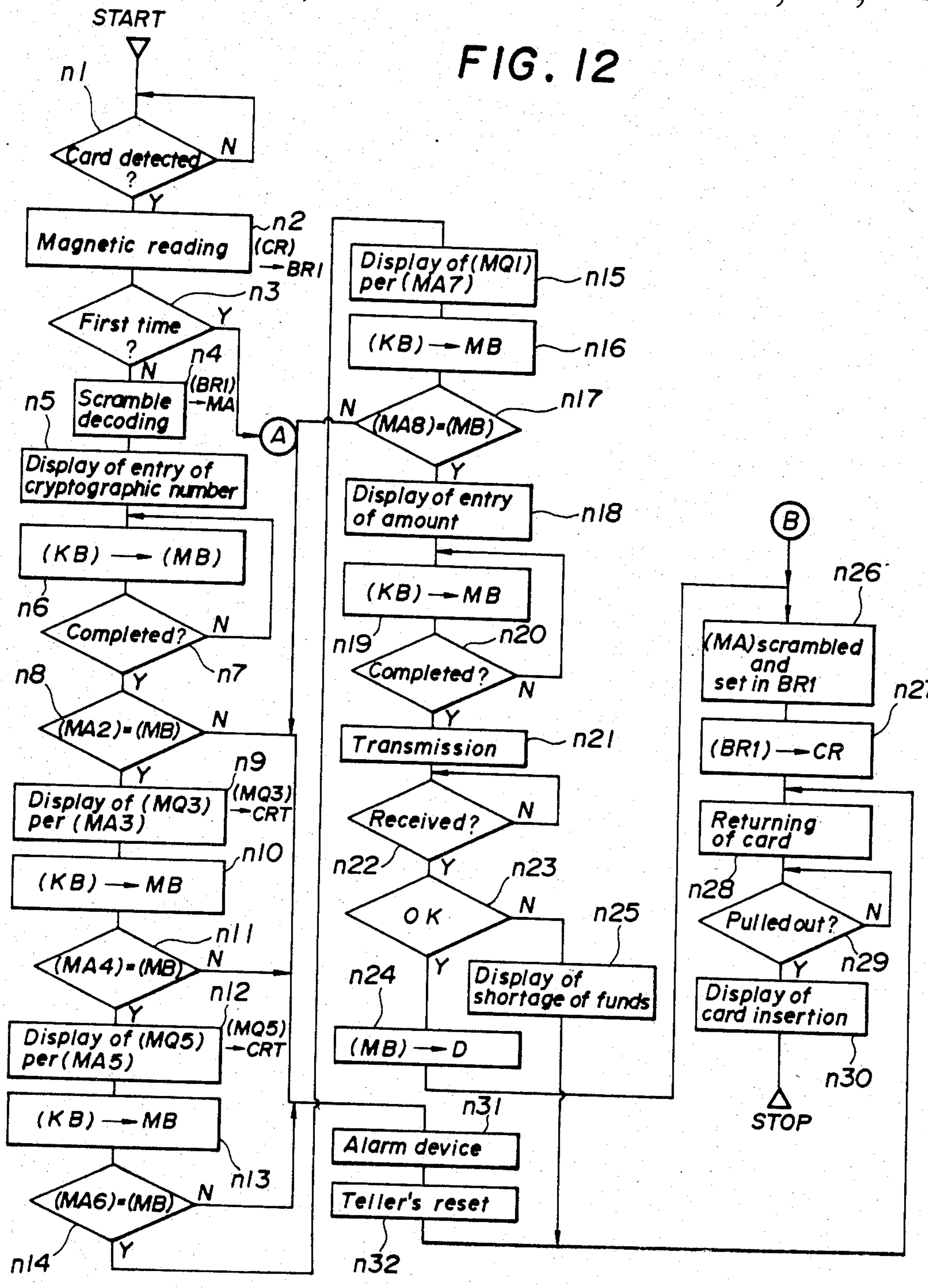
FIG. 12 and FIG. 13 are control flowcharts of a computer of the subsidiary equipment in said system.
Figure 13:
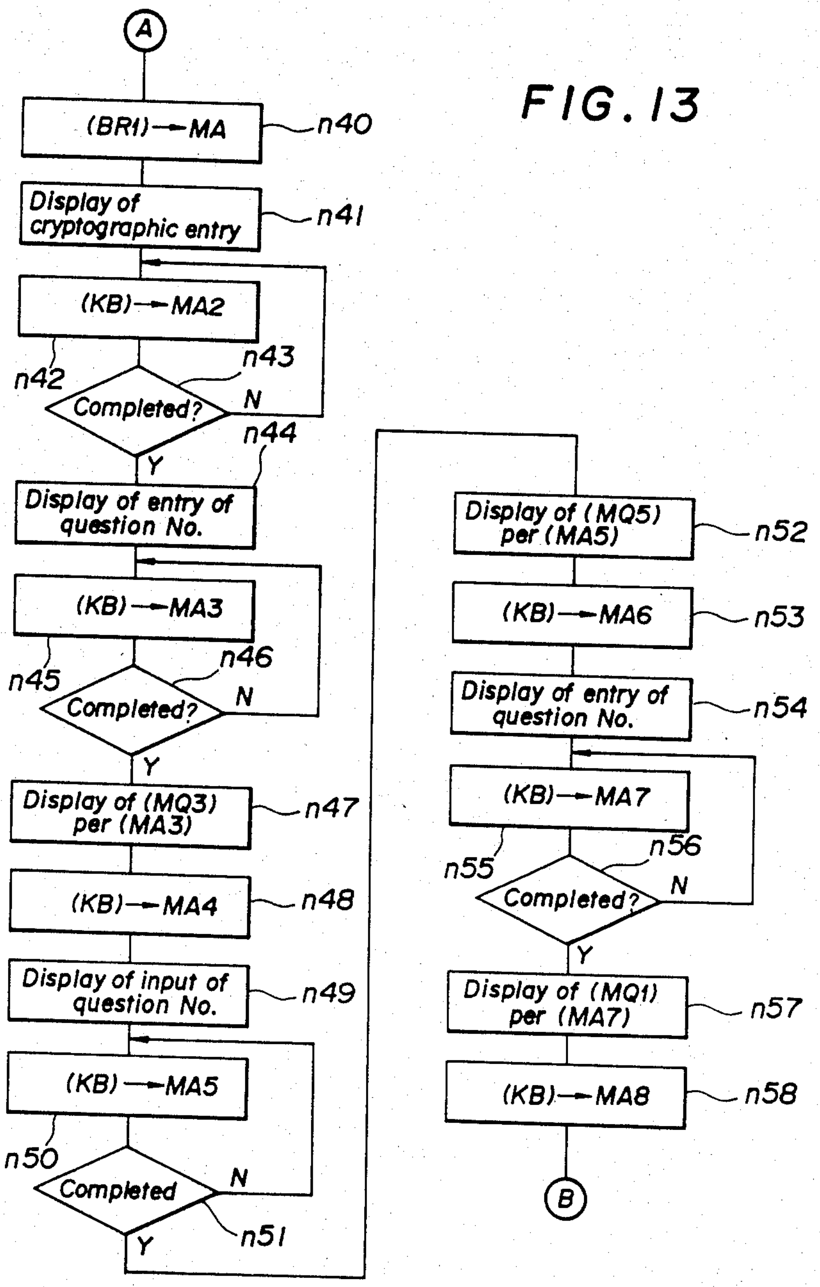
Figure 14:
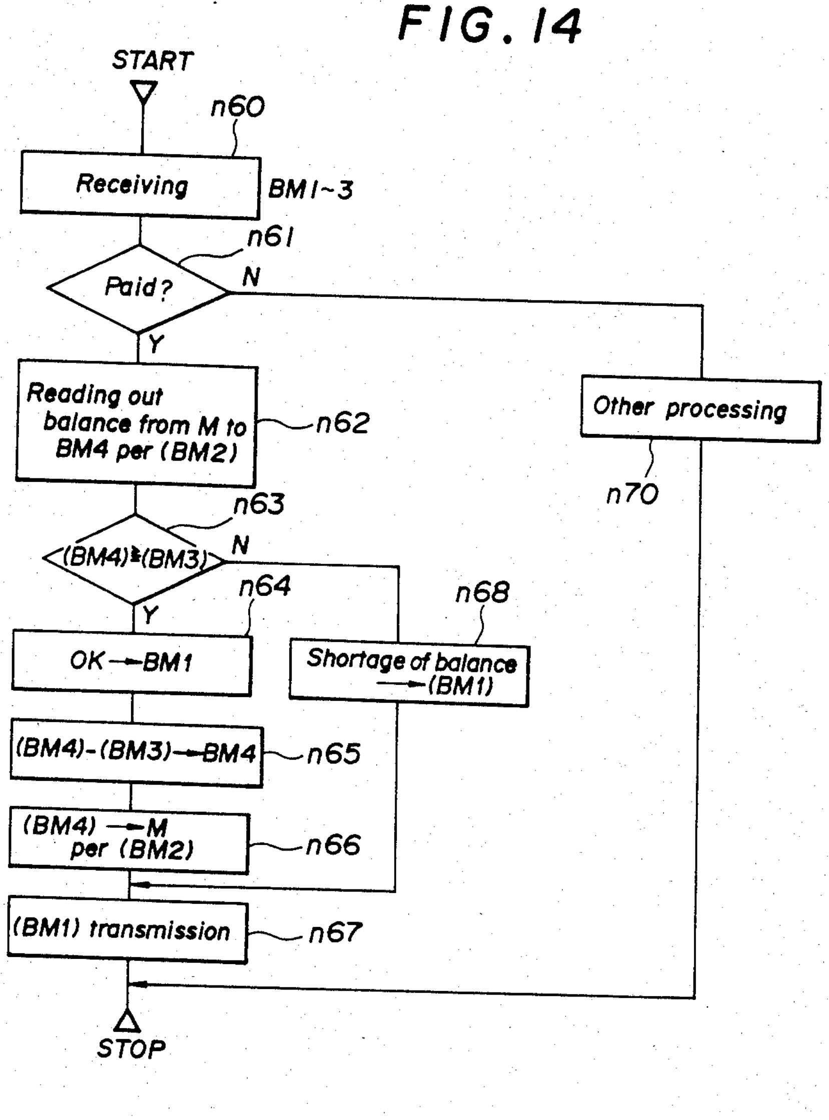
FIG. 14 is a control flowchart of a computer for the master equipment of said system.

FIG. 10 shows a partial map of the memory 2, and FIG. 11 shows a partial map of the buffer memory 13. Also, FIG. 12 through FIG. 14 show the control flowchart of the system. Now, the control procedure of this system will be described hereinafter by making reference to FIG. 10, FIG. 11 and FIG. 12 through FIG. 14.

FIGS. 12 and 13 show control flowchart indicating the operation of CPU 1 of the subsidiary equipment.

When a card input is detected in the step n1 (step n1 will be called merely n1 hereinafter), the card reading is performed in n2. Only the account number is recorded on the card at the time of its issue. Therefore, if the information read in n2 is only the account number, this means that this card is being used for the first time. The first use of the card is judged in n3. And if the first use is detected, the operation advances to n40 of the flowchart shown in FIG. 5.

In the control procedure shown in FIG. 13, the card information registration is performed for the card. In this embodiment, the card information consists of the questions and answers to the questions, and the cryptographic number. However, it is not always required to include the cryptographic number, and the card information may include only the questions and the answers to the questions.

In the first step n40 for registering the card information, the information read (account No.) is set in the region MA. This region MA comprizes the regions MA1 to MA8. These regions MA1 to MA8 are used for storing the account number, cryptographic number, first question number, answer to the first question, second question number, answer to the second question, third question number, and answer to the third question in the order listed. Then, s display instructing "entry of cryptographic number" is made n41, and the cryptographic number entered in n42 and n43 is set in the region MA2. When the cryptographic number is set in the region MA2, a display instruction "entry of question No." is made in n44, and the question No. entered in n45 and n46 is set in the region MA3. In n47, the question content data (questions and choices of answers) is read out for display from the region MQ for storing file of questions and choices of answer (question file) by making refernce to the data (first question No.) set in the region MA3. Then, in n48, the data (selected answer) entered by an user (card owner) is set in the region MA4. In the steps n44 to n48 stated above, the setting of the first question and corresponding answer are completed. In the same manner, the second question and corresponding answer are set in n49 to n53, and the third question and corresponding answer are set in n54 through n58. Also, said file is stored in the region MQ in advance, and the question No. entered in n45, n50 and n55 can be freely selected from the file by the user. Also, though three questions, are entered in this embodiment, any number of question can be employed as long as the number is smaller than the number of questions predetermined in said file.

Thus, when the card information consisting of the cryptographic number, three questions and corresponding answers are set in the region MA, this card information is registered on the card. The registration of this card information is made in n26 and thereafter. At first, in n26, the contents of the region MA are scrambled and set in the buffer register 3. In the scramble, the right card information set in the region MA will be in appearance turned to other information in accordance with particular rules (such as method using the complement of 9). This scramble is performed in order to prevent the right card information from being known, for example, after the card was stolen. Therefore, this scramble is not always required. The data (card information) scrambled and set in the buffer register 3 is then transferred to the card reader 7 (having the functions of writer) in n27 and then the card information is registered on the card already in the card reader. Then, the card returned in n28, the pull-out of card is confirmed in n29, "card insertion" is displayed in n30, and then use of a next card is waited.

As stated above, the registration of the card information is performed by the card itself. Also, the card information may be registered as the card information record file in the memory 2 or memory 12. And, in this case, the read-out and registration (write) of the card information are performed using the account number as an index.

Then, the control procedure when a card is going to be used for the second time of thereinafter.

If the card is going to be used for the second time or thereafter, the operation advances from n1 to n2, to n3 and to n4. In this case, the card information of the account number, cryptographic number, questions and answers (3 kinds) are recorded on the card itself. In n4, the card information read in n2 is scrambled and decoded, and decoded information is written in the region MA of the memory 2. However, n4 is the step corresponding to n26, and n4 is not required when omitting n26. In n5, a display instructing "entry of the cryptographic number" is made on CRT 6. In n6 and n7, a numeral with the predetermined number entered from the keyboard 4 is written in the region MB. In n8, the coincidence of the stored data in the region MB with the stored data in the region MA2 (cryptographic number registered in the card) is checked. If they coincide with each other, this means that the cryptographic number has been properly entered, so that the operation advances to n9.

In n9 to n17, the answers to the questions are checked. In n9, the contents of region MA3 are used as index, and the question content data (consisting of questions and choices of answer) corresponding to the index is read out of the question file (region MQ) and is displayed. In this example, the contents of the region MA3 are the question No. 3 and, thus, the contents of the corresponding region MQ2 are displayed. Also, as stated above, the question file has been prepared in advance and stored in the region MQ in the memory 2. Then, in n10, the data of answer entered from the keyboard 4 is written in the region MB. In n11, the answer stored in the region MB is compared to the answer in the region MA4 (registered answer). If these two answers coincide with each other, the next checking is performed. The display of the next question and the checking of its answer are performed in n12 to n14. The checking method is as same as that of n9 through n11. That is, the next question and the choices of answer are displayed in n12, and the coincidence of the answer entered for the question and stored in the region MB with the answer in the region MA6 is checked. In the same manner, the answer to the third question is checked in n15 through n17. Also, as described before, though three questions are used in this example, the number of questions is not limited to three. At the time of registration of the questions and answers on the card, a predetermined number of questions (three in this case) will be selected out of all questions in this question file.

In the answers coincide with each other in the checking of n17, the payment processing of the amount requested is started in the steps n17 and thereafter. However, if any one of answers of said three questions does not coincide, the operation advances to n31 from n11, or n14 or n17, thereby causing the alarm device 8 to be activated. Also, if the cryptographic number will not coincide in n8, the operation advances to n30, causing the alarm device 8 to be operated. Therefore, if an answer entered for a question differs from the registered answer, the use of the card can be invalidated. After the operation of the alarm device 8, a teller may meet the fraudulent card user and depresses the reset button of the machine (n32). When the operation signal of the reset button is detected, the operation advances to n28.

Now, the procedure after n18 will be described below. In n18, a display instruction "entry of the amount" is made. In n19 and n20, the amount of payment requested which was entered from the keyboard 4 is set in the region MB. The amount of payment requested must be lower than the balance. However, since the balance data is stored in the memory 12 of the master equipment, the data (amount of payment requested) set in the region MB is transmitted together with the payment check instruction and account number to the master equipment in n21 in order to check whether the payment can be authorized or not.

In FIG. 14, master equipment, after receiving the transmit data from the subsidiary equipment, sets the received data in the region BM1 to BM3 (n60). At this stage, the payment check instruction has been set in the message region of the region BM1, the account number of the card has been set in region BM2, and the amount of payment requested previously set in region MB at n19 has been set in the region BM3 respectively. Then, the message of the region BM1 is checked in n61 and, if the message is the payment check instruction, the operation advances to n62. But if the message is other than the payment check instruction, the operation advances to n70. In n62, the balance data is read out of the memory 12 by making reference to the account number set in the region BM2, and is set in the region BM4. In n63, the balance set in the region BM4 is compared to the amount of payment requested already set in the region BM3 and, except the case where the former is smaller than the latter, the OK message for authorizing the payment is set in the region BM1 (n64). In n65 and n66, the balance data is rewritten. In n65, the amount data obtained after deducting the amount of the payment requested from the previous balance is set in the region BM4. Then, in n66, by making reference to the account number of the region BM2, the data (new balance) in the region BM4 is written in the balance data storing area in the memory 12. Upon completion of the above processing, the message in the region BM or the OK message is transmitted to the subsidiary equipment.

On the other hand, if the data (balance) in the region BM4 is smaller than the data (amount of payment requested) in the region BM 3 in n63, that is, if the amount of payment requested exceeds the balance, the operation advances to n68 and the message of shortage of funds is set in the region BM1. In this case, the operation advances to n67 without rewriting the balance data and then the message of shortage of funds set in the region BM1 is transmitted to the subsidiary equipment.

When the processing in the master equipment is completed and OK message or message of shortage of funds is transmitted to the subsidiary equipment, the subsidiary equipment receives that message in n22. Then, the message is decoded in n28 and, if it is OK message, the operation advances to n24 but, if it is message of shortage of funds, the operation advances to n25. In the former case, that is, in the case of OK message, set data (amount of payment requested) of the region MB is transferred to the cash dispenser 5 in n24, and the payment of the amount of payment requested already set in the region MB is commanded to the cash dispenser 5. Upon completion of the payment, the writing in the card and the card returning process are performed. This processing is performed by the procedure in the steps n26 and thereafter. That is, the data in the region MA is scrambled and set in the buffer register 8 in n26, and the contents of the buffer register are transferred to the card reader 7 in n27 and recorded on the card. At this stage, the data which may have been possibly changed after the time of card input is only the balance data. Therefore, if the message received from the master equipment in n22 is OK message, the amount obtained after deducting the amount of payment requested from the previous balance will be recorded as a new balance. Upon completion of n27 and recording to the card, the card is returned in n28, the pull-out of card is confirmed in n29, "card instruction" is displayed in n30, and a next card input is waited.

On the other hand, if the received data is judged to be a message of shortage of balance in n23, the operation advances to n25, and "shortage of balance" is displayed without operating the cash dispenser 5. Then, the card return processing in the steps n28 and thereafter is executed and the operation is completed. Therefore, in this case, no writing to the card is performed and the card is returned as it is.

In the above procedure, both the checking of the card at its use and the payment of the requested amount can be performed if the card has been found to be acceptable.

Also, in this embodiment, only the registration of questions and answers can be made at the use of the card for the first time. However, if the procedure from n27 to n18 is taken, then a payment of deposit can be performed while the card is being inserted. Also, in the above description, described was the system which stores in the master equipment the balance data corresponding to the account number after making an online connection through a communication line between the subsidiary equipment and master equipment. However, if the balance data is stored in the subsidiary equipment or in the card itself, then the present invention may be applied also to an offline system in which the subsidiary equipment is separated from the master equipment.

As described above, according to the embodiment of the present invention, at least part of the card information comprizes the questions and answers to these questions, and the questions and answers to be registered will be selected by the card owner from the question file prepared in advance. Thus, many various combinations of the questions and answers can be made, and the card owners will be able to easily memorize the answers even though the number of registered answers is increased, so that a very practical card use system with a high accuracy in checking card at its use can be provided without giving any burden to the card owner.

Figure 15:
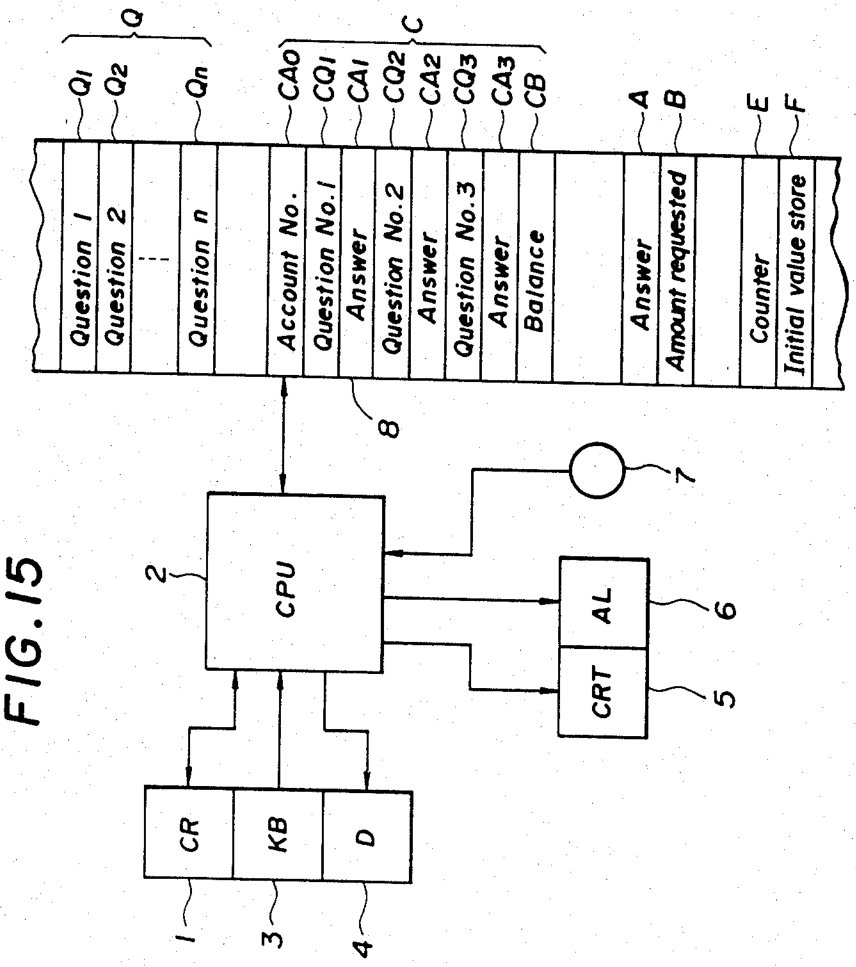
FIG. 15 is a block diagram of the bank transaction processing system indicating the fourth embodiment of the system embodying the present invention.

FIG. 15 is a block diagram of a bank transaction processing sytem having the system of the fourth embodiment of the present invention. In this figure, a card reader 1 reads the registered information from a card inserted to a card inlet of the card reader and enters the information in CPU 4 (central processing unit). The card, which is read by the card reader 1, stores customer's account No., three registered question Nos. and answer Nos., and balance of deposit. Also, in this figure, indicated are a keyboard 3 for entering by the key operation the data in CPU 2 by a customer, a cash dispenser 4 for releasing a required amount of bills after receiving a command from CPU 2, a CRT display unit 5 for displaying the sentences of questions and answers, an alarm unit 6 for generating alarm when an uncoincidence occurs during the collation, and a teller's operating unit 7 having keys for performing the predetermined processing after turning off an alarm that was generated from the alarm unit 6. A memory 8 has the question sentence store region Q, store region C for storing the registered information read from a card, and other store regions. Naturally, the memory 8 is freely able to read/write the data coupled to the CPU 2. CPU 2 executes the various kinds of processing operations in accordance with its built-in program. The control of the personal collation processing at the time of cash payment is performed in accordance with the flowchart shown in FIG. 16.

Figure 16:
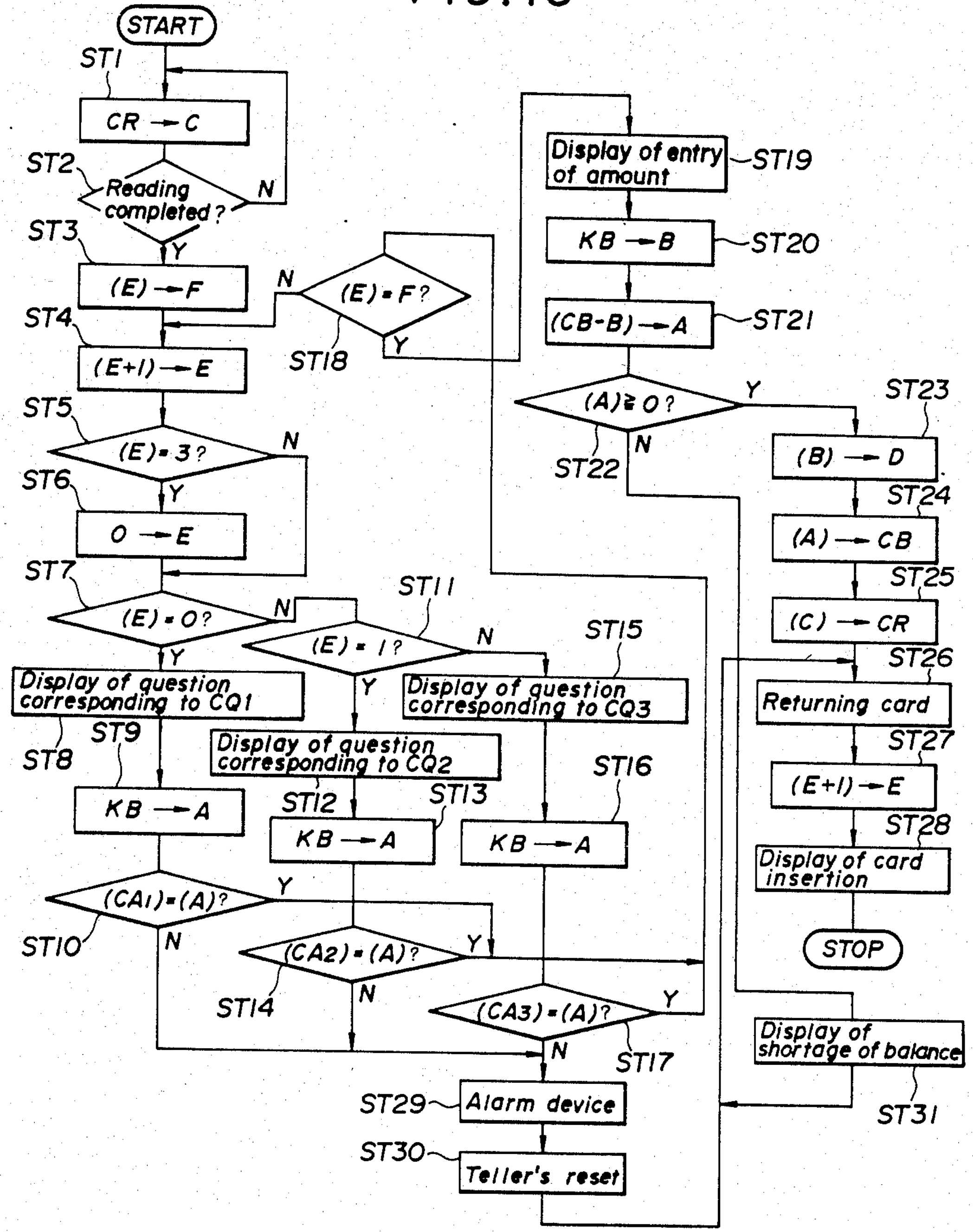
FIG. 16 is a control flowchart in said system.

Now, the operation of the personal collation processing of the processing system shown in FIG. 15 will be described by making reference to FIG. 16.

If a customer puts his card in the card inlet of the card reader 1, then the card reader 1 reads the data stored in the card and enters the data in CPU 2. Then, in step ST (this will be merely called "ST" hereinafter) 1, CPU 2 stores the data taken from card reader 1 in the store region C of the memory 8. If, for example, the account No., question No. 1 and its answer No., question No. 2 and its answer No., and also question No. 3 and its answer No. have been stored in the card, then each registered data of them is stored respectively in the store regions CQ1, CQ2, CQ3, CA0, CA1, CA2 and CA3 of the store region C. For another customer, the different account No. and question Nos. will be naturally used.

When the reading of the registration data from a card is completed, YES is judged for "read completed?" of ST2 and then the operation advances to the next ST3, thereby transferring the contents of the counter E to the initial value store region F. Counter E is a counter for counting a value up to 3; three is used because three questions have been selected for the collation. The counter E is so cycled as to add 1 to its contents every time when the collating operation is performed as described later. If the contents of the counter E are 0, for example, then 0 is stored in the store region F as initial value prior to the collating operation. Then, 1 is added to the contents of the counter E in the next ST4. In the above example, 1 is added because the contents of the counter E were 0. Then, "(E)=3" is judged in ST5. If the contents of the counter E are 3, then the operation advances to ST6 after judging YES, the contents of the counter E are set to 0, and the operation advances to ST7. If the contents of the counter E are not 0, the operation advances to ST7 after the judgement of NO. In the above example, since (E)=1, the operation advances from ST5 to ST7. In ST7, "(E)=0" is judged. In the case of (E)=1, NO is judged and the operation advances to ST11, and "(E)=1" is judged. If YES is judged, the operation advances to ST12. In ST12, the sentence of the question 2 corresponding to question No. 2 stored in the store region CQ2 is read out of the memory region Q(Q5) and displayed on the CRT display unit 5. In the case of question stated above, "Which of the following hobbies do you have? Enter the corresponding answer number" will be displayed and also the answer No. is displayed as same as the above example. A customer who saw this display and likes sports as hobby, for instance, will enter the answer No. 2 with the keyboard 3. And in ST14, "(CA2)=(A)" is judged, namely, it is judged whether the answer No. of the question No. 2 stored in the store region CA2 coincides with the answer No. stored in the store region A. If they coincide with each other, YES is judged and the answer collation for the first question is completed, and the operation advances to ST18. In ST18, it is judged whether the contents of both the store regions E and F coincide with each other. Since (F)=0 and (E)=1 in the above example, they do not coincide with each other, so that NO is judged and the operation advances to ST4.

In the operation after ST4, the answer collation of the second question in the present collation is started. At first, 1 is added to the counter E in ST4. Since (E)=1 in the above example, the contents in the counter E become 2. Then, in ST5, Whether "(E)=3" is judged in ST5, "(E)=0" in ST7, and "(E)=1" in ST11 sequentially, but NO is judged in all cases and the operation advances to ST15. In ST15, the sentence of the question 3 corresponding to question No. 3 stored in the store region CQ3 is read out of the store region CQ3, and the sentence is displayed on the CRT display unit 5. A customer who saw this display will enter the answer No. for the question with the keyboard 3 in ST16 in the same manner as done for the question No. 2 stated above. This answer No. is stored in the store region A, and then the the answer No. for the question 3 stored in the store region CA3 is compared to the entered answer No. stored in the store region A in ST17. If both of them coincide with each other, the answer collation of the second question of the present collation will be completed, and the operation moves again to ST18. In this case, since (E)=2 and (F)=0, "(E)=(F)" is judged to be NO and the operation moves to ST4.

Then, in the operation in ST4 and thereafter, the answer collation of the third question of the present collation is performed. In ST4, 1 is added to the content (E)=2 of the counter E, causing the contents to be become (E)=3. Therefore, In ST5, YES is judged for "(E)=3", and the counter E becomes 0 in ST6. Then, in ST7, "(E)=0" is judged to be YES and the operation advances to ST8. In ST8, the sentence of question 1 corresponding to the question No. 1 to be stored in the store region CQ1 is read out of the store region Q(Q1), and the sentence is displayed on the CRT display unit 5. When the customer who saw this display enters the answer No. for the question from the keyboard 3, then its answer No. is stored in the store region A in ST9. Then, in ST10, the answer No. for the question 1 stored in the store region CA1 is compared to the entered answer No. stored in the store region A. If both of them coincide with each other, YES is judged for ST10, thereby completing the answer collation for the third question of the present collation. Then, the operation advances to ST18. In this step, since (E)=0 and (F)=0, YES is judged for ST18 and the operation advances to ST19. Namely, three questions and answers of the present collation have been entered and collated, and the collation is determined to be OK when all registered answers for three questions coincide with the answers to the questions entered from the keyboard 3.

Then, In ST19, a display of "Enter a desired amount" is made on the CRT display unit 5. When the customer who saw this display enters the desired amount of withdrawal from the keyboard 3, this amount is stored in the requested amount store region B of the memory 8 in ST20. Then, in ST21, the result obtained by deducting the requested amount stored in the store region B from the balance stored in the store region CB is stored in the store region A. Then, in ST22, an judgement is made for "(A)≧0" and, if the balance is larger, the YES is judged and the operation advances to ST23, the requested amount in the store region B is sent to the cash dispenser 4, and then the payment processing is performed by the cash dispenser 4. on the other hand, the stored contents of the store region A as new balance are transferred to and stored in the store region CB in ST24, and the stored contents such as new balance in the store region C are written in the card by the card reader 1 in ST25. After this, the card is returned in ST26, and 1 is added to the contents of counter E in ST27. This processing is performed to change the start point in the cycle for the question No. of the first question to be asked out of three questions registered in the card every time when one transaction is completed. If (E)=2 occurs in this step, then the question of question NO. stored in the store region CQ3 is asked at the time of the next collation. Also, if (E)=3 occurs, the questioning will start from the question No. stored in the store region CQ1 at the time of next collation.

The operation is completed when a card insertion display is made for the next customer on the CRT display unit 5 in ST28 following ST27.

In ST22, if (A)<0, that is, the new balance becomes lower than 0, no payment processing performed and, instead, the operation advances to ST31, the shortage of funds is displayed on the CRT display unit 5, card is returned (ST26), 1 is added to the contents of counter E (ST27), and the card insertion display is performed for the next customer in ST28, thereby completing the operation.

An judgement of NO is made with the answer registered in ST10 or ST14 or ST17 does not coincide with the answer entered, then the operation advances to ST29 and an alarm is activated by the alarm device 6. Then, the teller who confirmed the alarm performs the predetermined processing such as reset at the teller's operating unit (ST30), and then the card returning, adding 1 to the counter E, and display of card insertion are performed as same as the operation made at the time of said display of the shortage of funds.

As stated above, the embodiment of the system of the present invention is able to take out the questions registered by changing as desired the order of questions asked from machine during collation and, thus, the order of plural questions to be made may vary depending upon the customers or every time when the transactions are performed. Hence, even if the Nos. of answers became known by other persons accidentially, they are unable to know which of the answers will correspond to a particular question asked and, thus, any fraudulent use of a card can be prevented.

Also, as another embodiment of the system of the present invention, a system as described below can be considered.

That is, in the personal identification system of said embodiments, common questions are prepared for all customers, answer data for all of these questions are registered for each customer, the machine selectes at random particular questions out of said all questions and displays them on the display unit, the answer data registered for any questions asked is repeatedly compared to the answer data entered by a customer in succession by changing the questions, and the collation is determined to be OK only when the entered answers coincide with the predetermined number of answers registered in succession.

Therefore, if the system is constructed as stated above, the questions asked at the time of collation will vary at each time of questioning and, thus, the chance of the entered answer Nos. becoming known by other persons and the chance of the fraudulent use can be extremely reduced, thereby assuring the safe collation processing.

Also, the system described above can be made in either online or offline mode.

In addition, as another embodiment of the system of the present invention, the following system can be considered.

Namely, the system may comprise a personal information store unit for storing plural questions and registering preselected answers to said questions for each person, display means for displaying the questions and the multiple choices of answer to said questions, first collation means for comparing the answers entered by an input device during operation to the answers registered in advance by an user, a particular questions assignment unit for assigning particular questions out of said plural questions, particular question modification means for reassigning said questions during each operation for each person, and second collation means for comparing anwers enterd by said input device for said particular questions during operation to predetermined answers registered in advance, thereby allowing to perform the personal collation with said first collation means and said second collation means.

However, according to said collation system, the personal collation is performed on the basis of whether the answer entered for the displayed question coincides with answer registered in advance and whether the answer entered for the particular question coincides with the predetermined answer and, thus, this system is able to facilitate the cryptographic code (relation between questions and answers) for each person and to preserve the higher degree of secrecy of the collation information since the particular questions requring the entry of the predetermined answers as conditions of collation are changed at the time of each operation.

The number and kinds of questions for performing the personal collation can be determined as desired. Also, the number of the multiple choices of answer for a question may be determined at discretion.

In addition, though the examples of embodiments of the system of the present invention only to the bank transaction processing system have been described above, the embodiments of the present invention is not limited only to those described above, and the present invention can be also applied to the personal collation for the entrance and exit gate control system, credit sales system and so forth using cards.

What I claim is:

1. A personal identification system comprising a card information store unit for writing therein questions and answers in a card itself or a card information store file separately provided during card input, display means for displaying the contents of questions written in said card information store unit, input means for entering the answers to a question displayed, and control means, said control means being capable of comparing an answer entered for the question displayed by said display means to an answer stored in said card information store unit, capable of making the use of said card effective upon coincidence of said answers with the each other.

2. The personal identification system of claim 1, said card information store unit being connected to an CPU as control means in the offline mode.

3. The personal identification system of claim 1, personal data stored in said card information store unit being stored in a memory of a master equipment, the data exchange being made in the online mode between said master equipment and a subsidiary equipment having the functions of a terminal unit.

4. A personal identification system comprising a card information registration means for registering the card information in a card itself at the first use of said card or in a card information record file provided separately, a question file recording predetermined plural questions and multiple choices of answer to each of said questions, and question-answer selection means for selecting desired questions and answers to said desired questions from said question file at the time of the first use of said card, said card information being formed with the information including at least the selected questions and answers selected for said questions, answers registered as said card information being compared to entered answers for the collation checking at the time of second use and thereafter.

5. The personal identification system of claim 4, said card information being formed with at least said questions and answers to said questions.

6. The personal identification system of claim 4, said card recording only the account number at the time of the first use of said card.

7. A personal identification system comprising a card information store unit for writing therein the questions and answers recorded on a card itself at the time of card input, display means for displaying the contents of questions written in said card information store unit, input means for entering answers to said questions displayed, comparison means for comparing answers entered by said input means to answers stored in said card information store unit, and question sequence change means for changing at discretion the sequence of questions stored in said card information store unit, said system being capable of taking out an output out of said questions stored in said card information store means after changing the sequence of questioning at discretion during the collation.

8. The personal identification system of claim 7, said question sequence change means comprising a counter, the contents of said question sequence change means being capable of adding 1 to said contents in the cycle at the time of each collating operation.

9. The personal identification system of claim 1, said questions comprising the contents asking the characteristics of the person himself of the card user.

10. The personal identification system of claim 1 wherein said control means not permitting the progress of transactions with said card upon non-coincidence of said answers with each other.

11. The personal identification system of claim 1, said control means not permitting further use of said card upon non-coincidence of said answers with each other.

12. The personal identification system of claim 1, said control means being capable of invalidating said card upon non-coincidence of said answers with each other.

* * * * *